United States Patent [19]
Random, Jr.

[11] 3,799,673
[45] Mar. 26, 1974

[54] SCATTERPLATE INTERFEROMETER

[75] Inventor: George A. Random, Jr., Newbury, Mass.

[73] Assignee: Sanders Associated, Inc., South Nashua, N.H.

[22] Filed: Apr. 17, 1972

[21] Appl. No.: 244,366

[52] U.S. Cl. ............................. 356/109, 356/111
[51] Int. Cl. ............................................. G01b 9/02
[58] Field of Search ........................ 356/106–113; 350/12, 13, 162 SF

[56] References Cited
UNITED STATES PATENTS
3,503,674  3/1970  Opperman ......................... 356/109

Primary Examiner—Ronald L. Wibert
Assistant Examiner—Conard Clark

[57] ABSTRACT

The components of a scatterplate interferometer are mounted compactly within a rugged housing which is adjustable along Cartesian coordinates so that it can be aligned relative to the optical component under test. The illumination section of the instrument receives light by way of a fiber bundle attached to an external light source. This light is imaged by a lens system onto a spot mirror on a diagonal window and the reflected light is transmitted through a scatterplate and imaged onto the optical component under test. The scattered return light from the scatterplate is collimated and directed back through the diagonal window and imaged onto an exit pupil plane behind the window. The unscattered return light is observed by the mirror so that an eye in the plane can view the interference fringes formed at the scatterplate without seeing the bright spot at the center of the plate caused by unscattered light. To facilitate aligning the instrument, the diagonal window can be replaced by a beam splitter and the optical train modified so that the operator can view the scatterplate directly.

9 Claims, 5 Drawing Figures

SCATTERPLATE INTERFEROMETER

BACKGROUND OF THE INVENTION

This invention relates to a scatterplate interferometer. It relates more particularly to an interferometer of this type which is particularly suited for hard use in an optical shop and in most field applications.

The scatterplate interferometer is relatively well known. Basically, it is a form of common path interferometer in which an interference fringe pattern is produced by super-imposing two beams of scattered light derived from a single source. One such apparatus is disclosed in U.S. Pat. No. 3,503,674, dated Mar. 31, 1970. The instrument is extremely useful for testing optical components and optical systems in auto-collimation. For example, it can detect surface irregularities in mirrors as well as in windows designed for double pass transmission.

The heart of the instrument is a translucent scatterplate that transmits light both specularly and by scattering. The light scattering is caused by the interaction of the incoming light with a plurality of very small light scattering particles or anomalies located on the surface of the scatterplate. Most commonly, the interferometer employs a single scatterplate which is designed so that each surface feature on the scatterplate has an identical companion located symmetrically relative to the center of the plate. In other words, the plate has two identical sets of scatterpoints symmetrically disposed about its center point.

In use, the scatterplate is interposed in the light path between a point source of monochromatic light and the optical device being tested, e.g. a spherical mirror, and, in this case, it is positioned with its center at the center of curvature of the mirror. Thus, the mirror forms a one-to-one image of the scatterplate on the surface of the plate. This image is, of course, inverted. However, because of the symmetry of scatterpoints about the center of curvature of the mirror, the image of these points is identical to the arrangement of the scatter points themselves and it coincides with them.

When light is transmitted through the scatterplate, part of the incident light is scattered by the scatter points so that a truly spherical wavefront emerges from each scatter point. This wavefront travels to the mirror which reflects it and focuses it essentially on the corresponding scatter point on the other side of the center of curvature. Part of this reflected light passes through the scatterplate undisturbed. Imperfections in the mirror, i.e. if it is not perfectly spherical, are impressed on this wavefront.

Also, some of the light from the point source is specularly transmitted by the plate. In other words, it is undisturbed by the scatter points on the plate. Consequently, it is focused at the vertex of the mirror. This light portion is then reflected back to the scatterplate, whereupon some of it is scattered. This produces an emerging spherical wavefront from each scatter point. Because the light was reflected from only a single point on the mirror being tested, i.e. its vertex, it does not reflect any imperfections in the mirror.

There are two other light paths through the system. First, some light passes undisturbed through the plate both to and from the mirror. The resulting beam of unscattered light comprises a narrow cone determined by the size of the scatterplate and its distance to the mirror. Second, some light from the source may be twice scattered on its travel to and from the mirror. However, the intensity of this twice scattered light is low enough to be disregarded.

If one's eye is placed very close to the scatterplate, on the side away from the mirror under test, one sees in the center of the field of view a small, bright spot corresponding to the light which is not scattered at all by the plate on its way to and from the mirror. The rest of the field of view shows interference fringes formed by (1) the wavefronts of the light which is scattered only on the way to the mirror and (2) the light which is scattered only on the way from the mirror. The former wavefront having been reflected from the entire surface of the mirror carries information about the shape of the mirror being tested. The latter wavefront, being reflected only from the vertex of the mirror, is always spherical and forms perfect reference wavefronts for the mirror under test.

Thus, the interference fringes formed by these two wavefronts display the shape errors of a mirror in much the same way as one would expect from a regular two-beam interferometer such as a Twyman & Green interferometer. For example, a perfect spherical mirror with its center of curvature located at the center of the scatterplate will produce no fringes because the two "interfering" returning wavefronts from each scatter point exactly coincide. However, if the mirror under test is not perfectly spherical or has surface irregularities, the wavefronts do interfere, causing fringes whose shape and arrangements are characteristic of the defects in the mirror.

In order for the scatterplate interferometer to have much practical application, the light beam entering the scatterplate from the light source must be separated from the light beam returning from the plate after modification by the component under test. Conventionally, this is accomplished by positioning the eyepiece or light source off axis and using a half-silvered mirror as a beam splitter. For example, with an off-axis light source, the beam splitter reflects light from the source through the scatterplate to the mirror under test. It also transmits at least a portion of the light returning from the test mirror and scatterplate to an on-axis eyepiece. A prior system such as this is disclosed, for example, in the aforesaid U.S. Pat. No. 3,503,674.

As soon as a beam splitter is placed in the optical path, however, a number of problems arise. First, the very bright spot in the center of the field of vision formed by the light from the source which has not been scattered at all by the plate makes observations through the eyepiece extremely difficult and unpleasant. Also, observations of the exact arrangement of fringes on the scatterplate requires that the observer's eye be located in the plane of the scatterplate. This, of course, is impossible because of the presence of the beam splitter between the plate and the eyepiece.

More generally, however, prior scatterplate interferometers are not suitable for use in the field. This is because they are not rugged enough. Also, the procedure for aligning them is rather difficult and time-consuming.

Further, prior apparatus have test apertures no larger than about $f/3.5$. Consequently, they cannot be used to test mirrors having $f$-numbers smaller than 3.5. In addition, the conventional devices have relatively short eye relief. Not only is this inconvenient and tiring as far as the viewer is concerned, but the short relief makes it more difficult to take clear photographs of the fringes developed by the interferometer.

Other more specific disadvantages of the prior interferometers of this type relate to errors caused by convection currents due to the heat generated by the light source and by false images due to unwanted reflections from the scatterplate and other optical components of the system.

SUMMARY OF THE INVENTION

Accordingly, the present invention aims to provide a scatterplate interferometer designed especially for hard use in an optical laboratory and in the field.

Another object of the invention is to provide an interferometer of this type which is relatively easy to align and to operate.

Yet another object of the invention is to provide an interferometer of this type having a relatively large test aperture.

A further object of the invention is to provide a scatterplate interferometer which minimizes viewer eyestrain.

A further object of the invention is to provide an interferometer of this type which is unaffected by thermal currents generated by the light source.

Other objects will in part be obvious and will in part appear hereinafter.

The invention accordingly comprises the features of construction, combination of elements and arrangement of parts which will be exemplified in the construction hereinafter set forth, and the scope of the invention will be indicated in the claims.

Briefly, the optical components of the interferometer are contained in a small, compact housing, mounted atop a sturdy base. The housing is adjustable relative to the base through the use of micrometer screws positioned along a set of Cartesian coordinates. Thus, by following the alignment procedure to be described later, the interferometer can be aligned precisely relative to the optical component under test. This component, for purposes of the present description, is a spherical mirror. However, it should be understood that the interferometer can be used to test more elaborate optical systems such as Cassegrainian systems, paraboloidal mirrors, including off-axis sections thereof, flat mirrors and aspheric mirrors, to name but a few.

The optics within the interferometer housing are conveniently broken down into four sections, to wit: the illumination section, the eyepiece section, the scatterplate section and beam splitter-window section. A pinhole in the illumination section is illuminated by a fiber bundle attached to an external light source unit. Since this light source unit is completely separate from the interferometer per se, the heat generated by it does not affect the operation of the interferometer in any way.

The light from the illuminated pinhole is imaged by a lens system onto a spot mirror on a diagonal window beyond the lens system. This light is reflected from the mirror and imaged on the vertex of the mirror under test. The scatterplate is mounted just beyond the latter lens, i.e. between the lens and the mirror under test.

The returning light emanating from the scatter points is collimated and directed back through the diagonal window. It is then imaged onto an exit pupil plane. Thus, one's eye or a recorder placed in the exit pupil plane sees the interference fringes formed at the scatterplate. However, the observer does not see the bright spot at the center of the plate caused by the portion of the light which is not scattered at all by the plate. This is because this beam is converged on the spot mirror located on the diagonal window and thereby obscured from the viewer. Consequently, one can look at the fringes for a relatively long period without discomfort. Moreover, to further minimize eyestrain, the optical components in the scatterplate and eyepiece sections are arranged to provide relatively large eye relief.

The present interferometer is designed especially so that it can be aligned quickly and accurately with minimum effort on the part of the operator. More particularly, for initial crude positioning of the interferometer, the fiber optics bundle is arranged to illuminate a separate alignment source located in the housing wall at one side of the scatterplate section. This light is projected toward the mirror under test and is reflected back toward a target spot located at the opposite side of that section. Using the adjusting micrometers, the interferometer is adjusted so that the return image is centered on this target. At this point, the scatterplate is located sufficiently close to the center of the curvature of the mirror under test to allow the second more precise or "fine" adjustment to be described.

For the fine alignment of the instrument, the fiber bundle is again arranged to illuminate the pinhole source. Then the diagonal window is removed from the optical train and replaced by a beam splitter so that the light source is reflected by the beam splitter and forms a bright spot on the scatterplate. This light beam passes through the scatterplate and is imaged back thereon by the mirror under test, thereby forming a second light spot which is usually slightly displaced from the first. The operator observes these spots through the beam splitter and adjusts the micrometers until the two spots of light coincide. After additional slight adjustment with the window and spot mirror in place to be described later, the instrument is ready for use.

The present system has the distinct advantage of allowing the operator to view the scatterplate directly during the alignment process. Then when the interferometer is in alignment, the operator can view the interference fringes developed by the scatterplate and thus obtain an indication of whether or not the optical device being tested is of the proper quality.

The elements in the optical train of the present interferometer have a relatively wide aperture on the order of F/2. Therefore, the interferometer can be used to test optical components and systems having comparable apertures.

Finally, the interferometer has a relatively rugged mechanical construction so that it can be used in the laboratory and in the field for a relatively long period without requiring maintenance or extensive adjustment.

BRIEF DESCRIPTION OF THE DRAWINGS

For a fuller understanding of the nature and objects of the invention, references should be had to the following detailed description taken in connection with the accompanying drawings, in which.

DESCRIPTION OF THE PREFERRED EMBODIMENT

Figure 1:
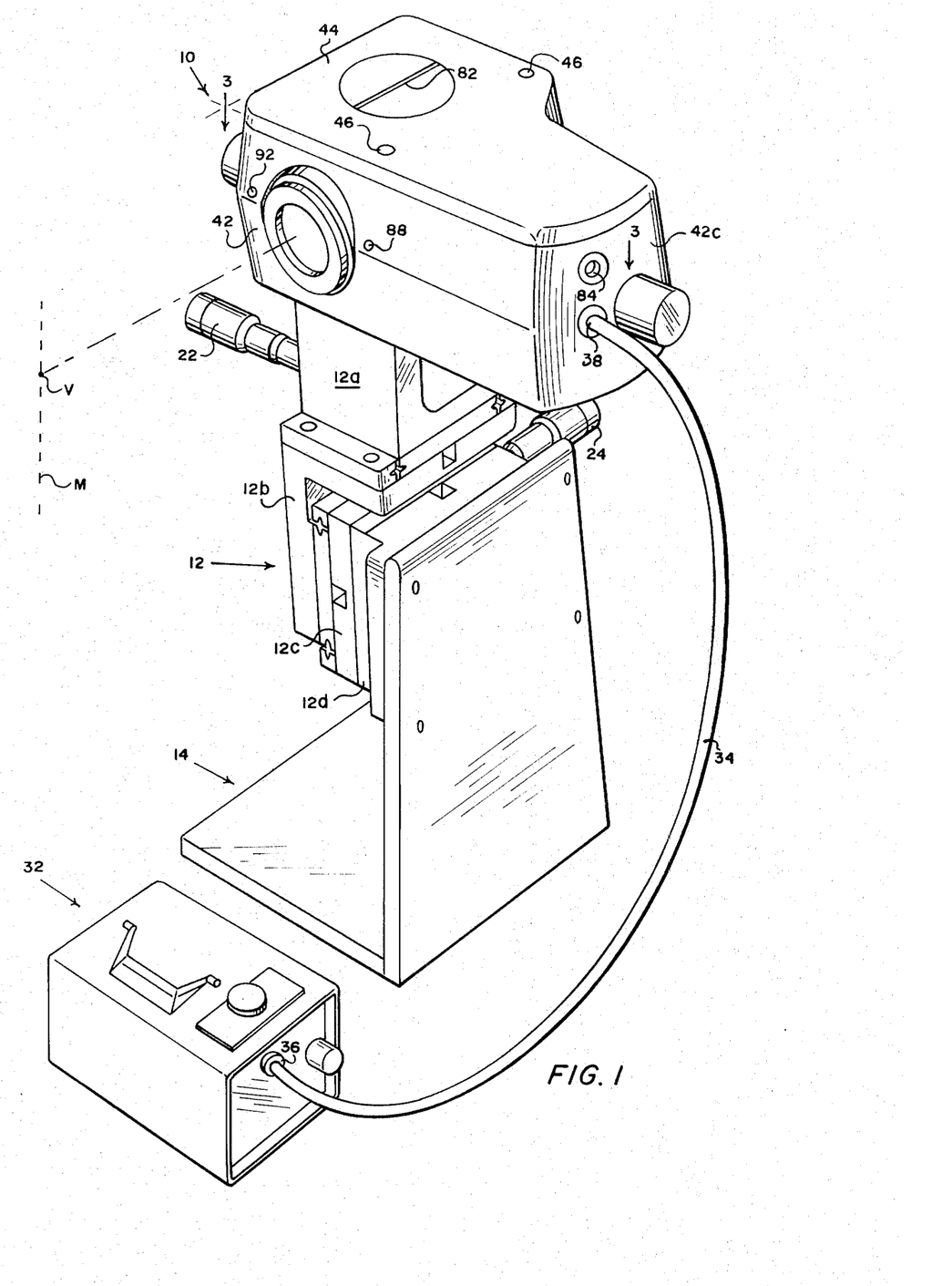
FIG. 1 is an isometric view from one side of an interferometer and light source unit made in accordance with this invention.
Figure 2:
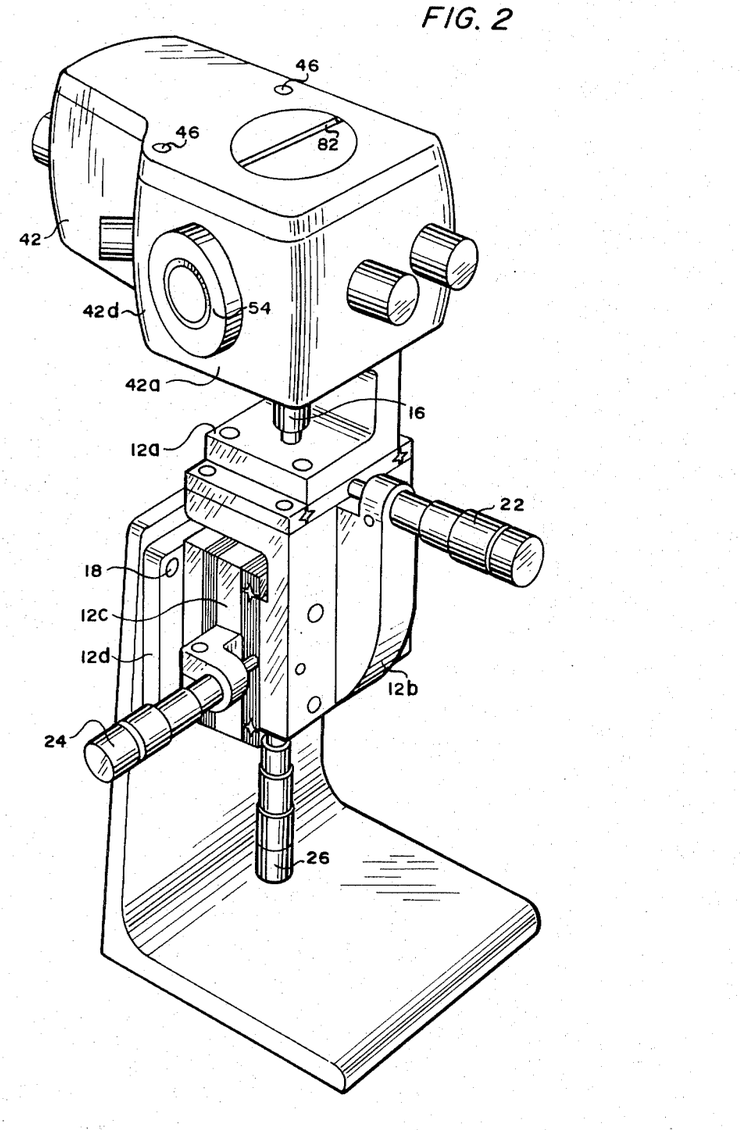
FIG. 2 is a similar view from the opposite side showing the interferometer alone.

Referring to FIGS. 1 and 2, the interferometer per se shown generally at 10 is mounted atop a micrometer assembly indicated generally at 12 which is, in turn, secured to a sturdy L-shaped base 14. The micrometer assembly 12 consists of four sliding sections, 12a, 12b, 12c and 12d. Interferometer 10 is removably secured to section 12a by a screw 16 (FIG. 2) rotatively mounted in section 12a and turned down into a threaded opening (not shown) in the underside of interferometer 10. The interferometer sections 12a, 12b and 12c are keyed together so that they can be moved back and forth along three mutually perpendicular axes relative to section 12d. In other words, in Cartesian coordinates, section 12a carrying interferometer 10 is slidably along the X axis, section 12b which carries section 12a and the interferometer are movable along the Y axis and section 12c (carrying sections 12a and 12b and the interferometer) is moveable along the Z axis. Movement of section 12a is accomplished by adjusting a micrometer 22 acting between sections 12a and 12b. Movement of section 12b is effected by a micrometer 24 acting between sections 12b and 12c. Finally, Z axis movement of the interferometer is accomplished by turning a micrometer 26 acting between sections 12c and 12d. Thus, by manipulating all three micrometers, the interferometer 10 can be moved in any direction in the Cartesian system.

Light for the interferometer is supplied by a separate light source unit shown generally at 32 in FIG. 1. The light generated by this unit is coupled to the interferometer by means of a fiber optics bundle 34. One end of bundle 34 protrudes into a light source recess 36 in the front wall of unit 32. The other end of bundle 34 protrudes into a similar recess 38 in the side of interferometer 10. Since the light source unit 32 is completely separate from the interferometer, there is no heat coupled to the latter system that might tend to cause slight distortions of the elements of the optical train and thus degrade the accuracy of the instrument.

Figure 3:
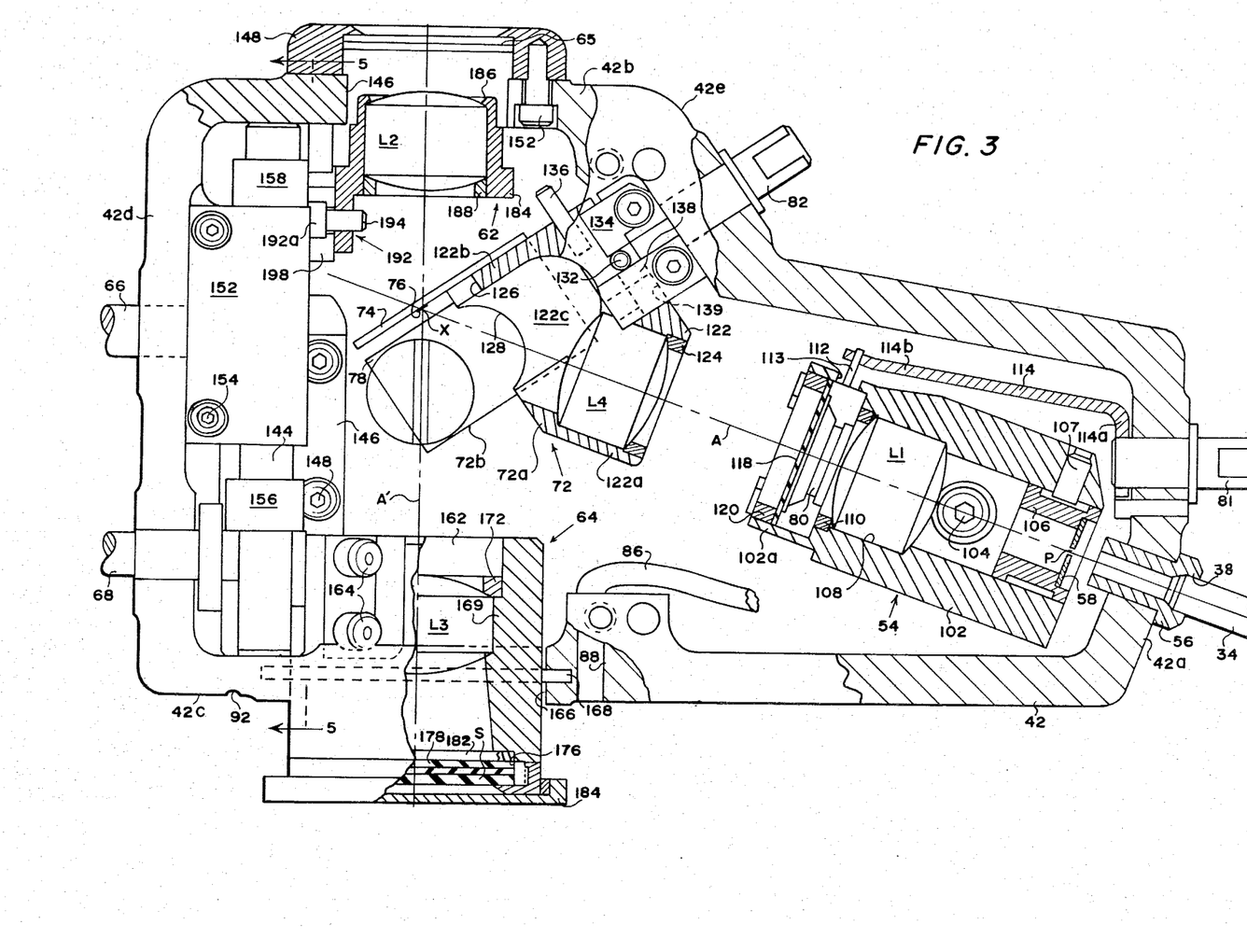
FIG. 3 is a sectional view along line 3—3 of FIG. 1.

Turning now to FIGS. 1 and 3, interferometer 10 comprises a relatively deep, generally L-shaped housing 42. The top of the housing is closed off by a cover 44 which is secured to the housing by screws 46.

The optical components of the interferometer are all contained in housing 42. More particularly, a cylindrical illumination cell 54 is mounted in housing 42 adjacent its end wall 42a. The optical axis A of cell 54 is aligned with the longitudinal axis of a bushing 56 mounted in wall 42a. This bushing defines the recess 38 in which the end of the fiber bundle 34 is placed. Cell 54 contains a plate 58 having a pinhole P situated on axis A. A converging lens L1 following plate 58 collimates the light from pinhole P along axis A.

An eyepiece cell shown generally at 62 is slidably mounted in the housing side wall 42b. Cell 62 comprises a converging lens L2 having an optical axis A' which intersects axis A at point X and, with axis A, defines a horizontal plane. A window 65 in wall 42b allows the operator to look through lens L2. This lens can be moved along axis A' by turning a focus control shaft 66 in wall 42d. Also, when shaft 66 is turned clockwise beyond its normal focus, travel lens L2 is swung out of the optical train. This mechanism will be described in more detail later.

Directly opposite cell 62 is a scatterplate cell shown generally at 64 slidably mounted in housing side wall 42c. Cell 64 includes a converging lens L3 and beyond that a scatterplate S. The optical axis of cell 64 also coincides with axis A'. The distance between cell 64 and the intersection point X can be adjusted by means of a focus control shaft 68 protruding from wall 42d.

A combination beam splitter and spot mirror cell shown generally at 72 is mounted in the housing side wall 42e between cells 54 and 62. Cell 72 has two sections 72a and 72b. Section 72a comprises a converging lens L4 and a transparent plate 74 which carries an aluminized spot mirror 76. Cell section 72b consists simply of a beam splitter (semi-silvered mirror) 78. Cell 72 has two operative positions selected by rotating a control shaft 82 mounted in wall 42e. In one position shown in FIG. 3 defined as the operative position, the optical elements of section 72a are aligned with the optical axis A. Also, the mirror 76 is positioned exactly at the intersection point X of axis A and A' and makes equal angles with those axes. The other position of cell 72, defined as the alignment position, will be described later.

Figure 4:
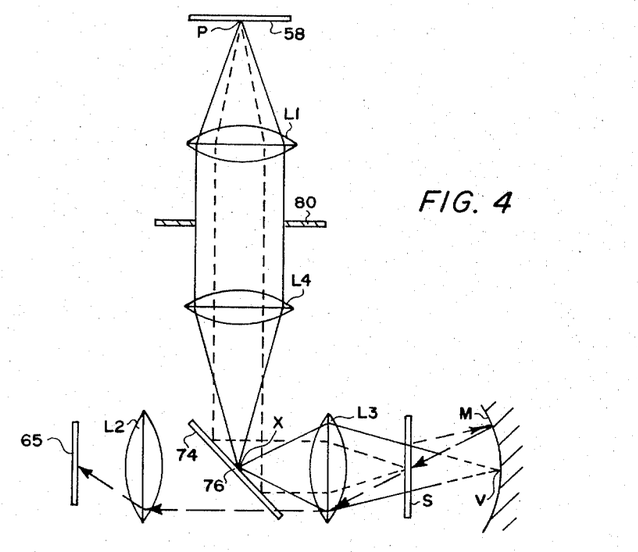
FIG. 4 is a schematic view of the interferometer optical train.

In the operative position of cell 72, the illuminated pinhole P is imaged by lenses L1 and L4 on mirror 76. The spot image is then reflected by the mirror along axis A'. The position of cell 64 on axis A' is adjusted by focus control shaft 68 so that its lens L3 images the illuminated pinhole on the mirror M under test (FIG. 4). The scatterplate S is mounted in the light beam emerging from lens L3 and the plate area so illuminated is controlled by an iris diaphragm 80. The diaphragm aperture may be adjusted by rotating a control shaft 81 in housing wall 42a to minimize fringe distortion. This occurs when an excessively large area of the plate is illuminated.

To help clarify the description of the interferometer optical train and the various light paths, we have shown the optical train schematically in FIG. 4. The full line light rays represent geometrical light focused on the vertex V of mirror M. The dashed lines represent the path of the reflected scattered beam with the cell 72 in its operative position. The dotted lines show the light path when the cell 72 is in its alignment position to be described later.

Referring to FIGS. 3 and 4, when the system is properly aligned and focused, the light reflected by spot mirror 76 which is not scattered by plate S on the way to the mirror M is focused exactly on the vertex V of the mirror. This light is reflected by the mirror M back through the scatterplate S where part of it is scattered into a cone with the aperture of F/2. This results in emerging spherical wavefronts originating at the scatter points in the plate S. These wavefronts which are essentially unaffected by imperfections in the mirror M constitute a set of reference wavefronts.

The portion of the light which is scattered on the first pass through the scatterplate consists of spherical wavefronts, each of which essentially fills the mirror M and is reflected back to the scatterplate. Any imperfections in the mirror are impressed on these reflected wavefronts. Each of these wavefronts is converged around the corresponding scatter point symmetrically located with respect to the axis A'. The portion of each of these wavefronts which is not scattered on the return pass through the scatterplate S carries the information about the shape of the mirror M. Interference occurs between these wavefronts and the reference wavefronts and resultant interference fringes display the shape errors of the mirror in the usual way.

The light at the surface of the scatterplate is imaged by lens L3 and L2 at the eyepiece window 65. Therefore, an operator looking through the window is able to see the interference fringes as though his eye were placed in the plane of the scatterplate.

It is important to note that the observer at window 65 sees only the interference fringes formed by the light which is scattered only on the way to and only on the way from the mirror under test. This is because the very bright portion of the light which is not scattered at all is converged on the spot mirror 76 as mentioned above, and thus is obscured by that mirror. On the other hand, the light which is scattered on both passes through the plate S is too weak to be seen. As a result, the operator can use the instrument for a relatively long period without undue eye discomfort. Furthermore, he is able to see the fringes clearly so that imperfections in the mirror M can be diagnosed properly by observing the arrangement of these fringes.

The present interferometer design permits easy alignment with the mirror M to be tested. First, the operator sights along a groove 82 inscribed in the top of housing cover 44 (FIGS. 1 and 2) and adjusts the micrometers 22, 24, and 26 until the instrument is aimed at the ostensible vertex V of mirror M.

Next, referring to FIGS. 1 and 3, the operator withdraws the end of fiber bundle 34 from recess 38 and inserts it into a similar recess 84 (FIG. 1) located just above recess 38. A separate fiber optics bundle 86 (FIG. 3) inside housing 42 is connected between recess 84 and a passage 88 in housing wall 42c at one side of scatterplate cell 64. Light from the illuminated passage 88 is directed toward mirror M where it is reflected back toward a target 92 on housing wall 42c on the opposite side of cell 64 from passage 88. The operator adjusts the micrometers until the return beam is centered on target 92 in good focus.

Next, the operator follows the fine alignment procedure. More particularly, the fiber optics bundle 34 is returned to the operational recess 38. Then control shaft 66 is turned to its extreme clockwise position which swings lens L2 out of the optical train. Also, control shaft 82 is turned to move the beam splitter and spot mirror cell 72 to its second position, the alignment position. In this position, the lens L4 and spot mirror 76 are taken out of the optical train and beam splitter 78 assumes the position occupied by window 74 in FIG. 3. In other words, intersection X lies at a point on the surface of the beam splitter.

With this configuration, the light from pinhole P, as collimated by lens L1, is reflected from beam splitter 78 along axis A' toward the mirror M. A bright spot of light is formed on the scatterplate S and imaged back on the scatterplate by the mirror. Thus, the operator looking through the window 65 has a magnified view of the scatterplate surface through the beam splitter 78.

Accordingly, he is able to observe these two spots directly. By further manipulation of micrometers 24 and 26, the operator moves the interferometer in the X and Y directions to make these two spots of light coincide.

Following this, cell 72 is returned to its operative position shown in FIG. 3, with the lens L4 and spot mirror 76 in the optical train. This allows the operator to observe a fiduciary mark found on most scatterplates and to further adjust the position of the instrument so that the fiduciary mark coincides with its return image from mirror M. The fiduciary mark is simply a portion of the scatterplate devoid of scatter points and centered on the plate's center of symmetry. For example, it may take the form of an X as seen in the aforementioned U.S. Pat. No. 3,503,674. Finally, the eyepiece lens L2 is returned to its working position shown in FIG. 3 so that the operator can observe the interference fringes through the window 65. These fringes can be further adjusted, (e.g. to straighten them or to move their angular position) by appropriate movements of the micrometers. The instrument is now ready for use as described above.

Still referring to FIG. 3, all of the optical components of the interferometer 10 are ruggedly mounted in housing 42. More particularly, the components of the illumination cell 54 are contained in a sturdy cylindrical housing 102 secured to the bottom of housing 42 by a bolt 104. The plate 58 containing the pinhole P is seated in a bushing 106 which is recessed into the outer end of housing 102 and held there by a set screw 107. The lens L1 is seated in a counter bore 108 at the opposite end of housing 102 and retained by a ring 110.

The iris diaphragm 80 is situated just beyond the lens L1 within an extension 102a of housing 102. The diaphragm 80 is of conventional construction and has an arm 112 which protrudes through a slot 113 in the extension 102a wall. Movement of this arm about axis A in one direction or the other opens or closes the diaphragm. The arm 112 is connected to its control shaft 81 by means of an L-shaped crank 114. The short crank leg 114a is secured to the inner end of shaft 81 and the longer leg 114b is secured to the end of arm 112. Thus, when shaft 81 is turned, the crank 114 is swung around, thereby moving arm 112. A polarizing light filter 118 situated just beyond diaphragm 80 is held in place within housing extension 102a by a ring 120. The filter helps to minimize internal reflections in the optical train.

Still referring to FIG. 3, the beam splitter mirror cell 72 includes a fixture 122 mounted on the inner end of shaft 82 and rotatable therewith. The fixture 122 includes a generally cylindrical portion 122a which contains the lens L4, with the lens being held in place by a ring 124. Fixture 122 also has a flat wall 122b to which the end of window 74 is adhered. The end of wall 122b is recessed at 126 so that the major portion of window 74 is unobstructed. The beam splitter 78 is adhered in similar fashion to another wall 122c of that fixture which is oriented perpendicularly to wall 122b and has a similar recess 128.

A pin 132 projecting out from the base of fixture 122 engages a limit stop 134 secured to housing 42 to accurately fix cell 72 in its operative position. A second similar pin 136 projecting out of the base of fixture 122 engages a limit stop 138 when cell 72 is in its alignment position. The underside of the limit stop 138 is grooved at 139 to accommodate pin 132 when cell 72 is turned to that position.

Figure 5:
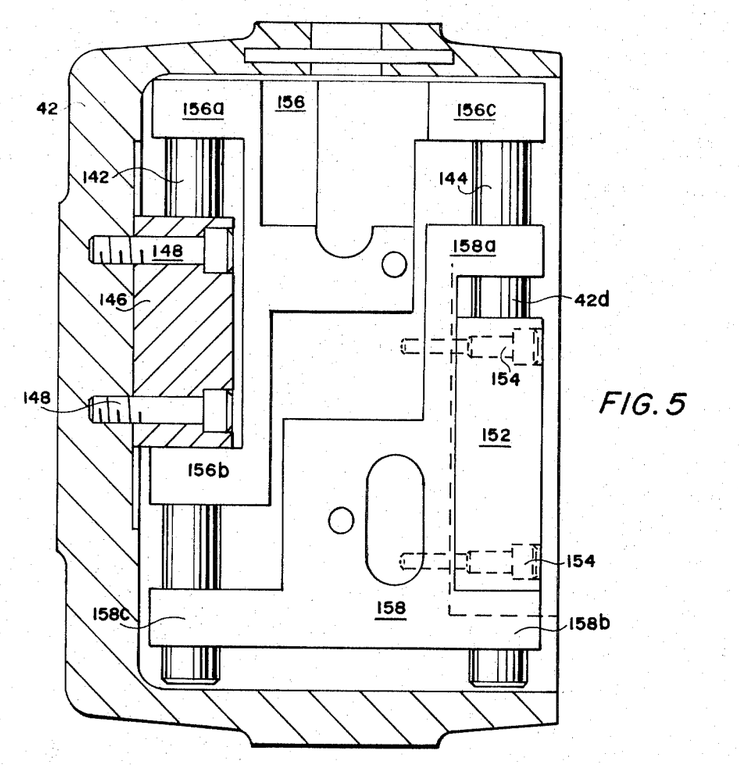
FIG. 5 is a sectional view along line 5—5 of FIG. 3.

Turning now to FIGS. 3 and 5, the cells 62 and 64 are slidably supported by a pair of sturdy transverse shafts 142 and 144 spaced apart adjacent to housing end wall 42d. Shaft 142 is clamped to the housing by a mounting block 146 secured to the bottom of the housing by bolts 148. Shaft 144, on the other hand, is positioned near the top of the housing and secured by a mounting block 152 affixed to housing wall 42d by bolts 154.

As seen in FIG. 5, a pair of carriages 156 and 158 are slidably mounted on shafts 142 and 144. Carriage 156 includes a pair of spaced parallel apertured arms 156a and 156b which slide on shaft 142 on opposite sides of block 142. A third apertured arm 156c, adjacent to arm 156a, slides on shaft 144. Fixture 158 is similar to fixture 156 except that it has parallel apertured arms 158a and 158b spaced on opposite sides of block 152 which slide on shaft 144. Its third apertured arm 158c, on the other hand, slides on shaft 142. The two carriages 156 and 158 are moved along shafts 142 and 144 parallel to axis A' by conventional rack and pinion mechanisms (not shown) actuated by control shafts 68 and 66, respectively.

As best seen in FIG. 3, scatterplate cell 64 is connected for movement with carriage 156. Specifically, the cell comprises a generally cylindrical housing 162 which is secured to carriage 156 by bolts 164. Housing 162 is slidably received in an opening 166 in the housing sidewall 42c. An annular seal 168 recessed into the wall of opening 166 ensures a tight sliding fit between housing 162 and housing 42.

The lens L3 is mounted in a counter bore 169 at the inner end of housing 162 and retained there by a suitable ring 172. The scatterplate S is mounted within a counter bore 176 at the outer end of the housing. Also, a quarter-wavelength filter 178 is sandwiched against the inner face of scatterplate S to minimize reflections from the back face of the scatterplate. The filter-scatterplate sandwich is seated on a felt gasket 182 and held in place by an annular cover assembly 184 which engages over the outer end of housing 162.

The eyepiece cell 62 includes a generally cylindrical housing 184. The lens L2 is seated against a flange 186 at the outer end of the housing and is retained there by a ring 188 at the housing inner end. Housing 184 is connected to a bell crank assembly shown generally at 192, including a shaft 194 rotatively mounted on carriage 158. When the carriage 158 moves toward intersection X beyond its normal focus adjustment, arm 192a of the bell crank engages a detent 198 projecting up from the bottom of the housing. This rotates shaft 194 and swings housing 184 off axis A', i.e. out of the plane of the drawing. The bell crank is spring-loaded so that it returns the lens L2 to the FIG. 3 position when the carriage 158 is subsequently moved away from intersection X.

An opening 196 in the housing sidewall 42b accommodates the axial movement of housing 184. This opening is covered by the window 65 which is held in place by an annular retainer 148 secured to the housing by bolts 152.

It will be seen from the foregoing, then, that the present interferometer is of extremely rugged construction so that it can be used for long periods in the field without requiring extensive maintenance or adjustment. Yet, the components of the interferometer are designed so that the cost thereof is kept to a minimum. With these advantages and the others described above relative to the ease of aligning and using the interferometer, the instrument is a valuable and versatile optical testing tool.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:
1. A scatterplate interferometer, comprising
   A. a source of collimated light
   B. a scatterplate
   C. means for positioning a reflecting test object to receive light from said source transmitted through said scatterplate and to reflect said light back through said scatterplate,
   D. a spot mirror positioned to receive light from said source along a first axis and to reflect it onto said scatterplate along a second axis,
   E. a first lens for focusing light from said source onto said mirror,
   F. a second lens for focussing light from said spot mirror onto said object,
   G. means forming an aperture in optical alignment with said mirror and said scatterplate for observing light transmitted from said scatterplate,
   H. said mirror being of a size such as to substantially block from transmission to said aperture unscattered light returned from said test object, but not substantially block scattered light therefrom.

2. In a scatterplate interferometer as defined in claim 1 further including:
   A. illumination means on said interferometer positioned to direct a light beam onto said object at an acute angle thereto, and
   B. target indicia on said interferometer positioned to receive light reflected from said object, the position of said reflected light on said indicia being indicative of the degree of alignment of said object.

3. The interferometer defined in claim 1 and further including an adjustable diaphragm between the light source and the mirror for controlling the amount of light incident on the scatterplate which is illuminated by the light from the source.

4. The interferometer defined in claim 1 and further including a lens situated behind the spot mirror whereby with the second lens a unity power telescope is formed for viewing the object under test and also for imaging the scatterplate in the exit pupil.

5. The interferometer defined in claim 4 and further including means for moving the lens behind the spot mirror out of said light path so that the surface of the scatterplate can be observed directly from the aperture.

6. The interferometer defined in claim 1 and wherein said second lens is situated on the second axis between the spot mirror and the test object.

7. The interferometer defined in claim 6 and further including a third lens positioned on the second axis behind the mirror opposite said scatterplate for imaging the scattered return light from the scatterplate onto said aperture so that interference fringes on the scatterplate can be observed by an eye in the plane.

8. The interferometer defined in claim 7 and further including
   A. means for adjusting the scatterplate and second lens along the second axis, and
   B. separate means for adjusting the third lens along the second axis.

9. The interferometer defined in claim 8 in which said source of collimated light comprises an uncollimated light source and a collimating lens, and further including
   A. a beam splitter,
   B. means for replacing the mirror and the first lens with the beam splitter so that collimated light from the source is reflected along the second axis toward the optical component under test, and
   C. means for moving the third lens off the second axis so that an observer at the aperture can view the surface of the scatterplate through the beam splitter and see a spot thereon caused by the collimated light reflected from the beam splitter and superimpose on it a similar spot returning from the optical component under test for purpose of aligning the interferometer.

* * * * *